Feb. 18, 1930. J. T. ZAK 1,747,207
RANGE FINDING INSTRUMENT
Filed Nov. 1, 1928
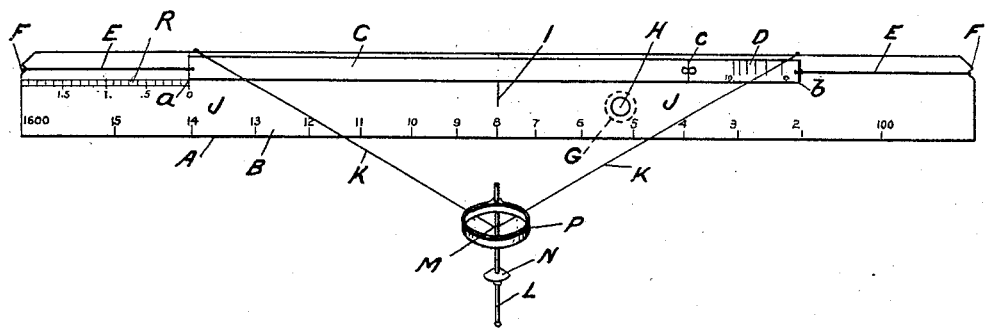
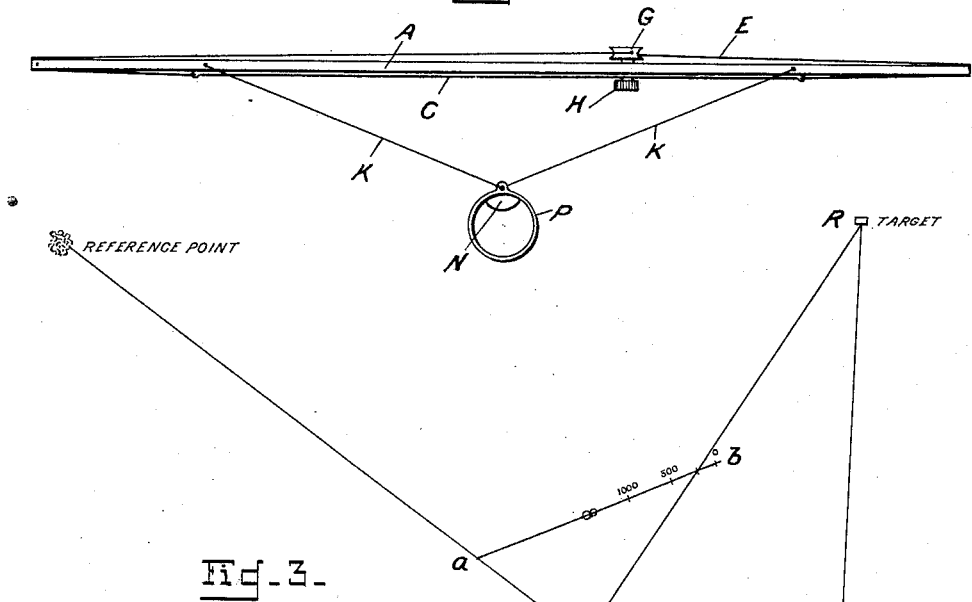
Inventor
Joseph T. Zak
By W. N. Roach
Attorney Patented Feb. 18, 1930

1,747,207

UNITED STATES PATENT OFFICE

JOSEPH T. ZAK, OF MILWAUKEE, WISCONSIN

RANGE-FINDING INSTRUMENT

Application filed November 1, 1928. Serial No. 316,507.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to range finding instruments.

The purpose of the invention is to provide an instrument which is capable of being easily and quickly operated in any position and which will provide a sufficiently accurate determination of range to meet the conditions of firing with a rifle or machine gun. The invention is characterized principally by having a range scale inscribed on an elastic band.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in front elevation of an instrument constructed in accordance with the invention;

Fig. 2 is a plan view thereof and

Fig. 3 is a diagrammatic view illustrating the manner of solving a range problem with the instrument.

Referring to the drawings by characters of reference:

The instrument consists of a bar A, preferably forty inches in length and graduated on the lower portion of one side with a mil scale B reading from zero to 1600.

An elastic band C, twenty-four inches in length, when unstretched inscribed with a range scale D is suspended in such a manner that it will lie flat against the upper portion of the bar above the mil scale. The suspension of the band is accomplished by means of cords EE secured to each end of the band and directed by means of guide grooves FF across the beveled corners of the bar and in rear thereof where they are attached to a spool G which is mounted on a shaft H passing through the bar. The range scale is based on the formula $RM = 1000\ W$ where R is range; M is the angular width in mils of the target or the target and reference object and W is the linear width. In the present case the range scale is calculated for a base line of fifty yards when the center I of the instrument is twenty inches from the eye. To facilitate assembly and adjustment and to insure accuracy the bar is provided with registration marks JJ which will be in alignment with the infinity range $c$ and with the ends $a$ and $b$ of the band when the band is stretched over a distance of twenty-four inches.

In order to insure the maintenance of this distance of twenty inches, a cord or cords KK are attached to the bar at points equi-distant from the center thereof. A small rod L is secured to the cord or cords so that the point of attachment M will be twenty inches from the center I of the bar when the cords are drawn taut. For the purpose of steadying the rod it carries a slidable mouth piece N and a head strap P whereby it may be held firmly against the cheek and forehead of the observer.

The method of employing the instrument for determining range is as follows: Referring to Fig. 3 $ab$ represents the rubber band with range scale. The observer stationed at O attaches the head strap P so that the point M of the rod L is directly in front of one eye; then, holding the instrument in both hands, he extends it along the line of vision towards the target until the cords are taut. He next selects as a reference point a prominent feature at one side of the target and rotates the shaft H until the elastic band is extended so that the end $a$ of the band is sighted on the reference point and the point $c$ denoting infinity on the range scale is sighted on the target.

Having made the initial adjustment at O the observer moves fifty yards in the direction of the reference point and at the point O' he takes a second observation by sighting the end $a$ of the band on the reference point and then notes where the line of vision to the target intersects the range scale. This reading, which in Fig. 3 is 250 yards, gives the range to the target.

For the sake of accuracy and convenience, the normal base line OO' of fifty yards may be varied in practice. When the target is apparently at a short range, the base line need only be twenty-five yards but in this event, the ultimate reading on the range scale will be halved. For a distant target a base line of 100 yards is preferable and the ultimate range reading should be doubled.

A slight error occurs at the greater angles when the reference point is in such relation to the target that the end of the rubber band approaches the end of the bar A. In order to make a correction for this error, a scale R is provided on the bar and marked in fractions of per cent of correction required. The end $a$ of the band, when stretched, will be over the scale and will indicate the percentage correction to be applied to the range reading.

When a suitable reference point can not be located to the left of the target, one can be selected to the right thereof and the procedure in determining the range will be the same, the instrument being inverted.

The mil scale B on the bar affords a means of measuring horizontal angles.

I claim:

1. A range finding instrument comprising a bar, means for holding the bar with its center at a predetermined distance with respect to the eye of the observer, an elastic band of predetermined length apposed along the bar and inscribed at one end with a range scale from zero to infinity, calculated according to a known base line, cords attached to the ends of the band, means for simultaneously actuating the cords to extend the band, there being registration marks on the bar determining the adjustment of the elements of the band and a percentage correction scale at one end of the bar beginning at the end of the band when in unstretched condition.

2. A range finding instrument comprising a bar, means for holding the bar with its center at a predetermined distance with respect to the eye of the observer, an elastic band of predetermined length apposed along the bar and inscribed at one end with a range scale from zero to infinity, calculated according to a known base line, cords attached to the ends of the band, means for simultaneously actuating the cords to extend the band and there being registration marks on the bar determining the adjustment of the elements of the band.

3. A range finding instrument comprising a bar, means for holding the bar with its center at a predetermined distance with respect to the eye of the observer, an elastic band of predetermined length apposed along the bar and inscribed at one end with a range scale from zero to infinity, calculated according to a known base line, cords attached to the ends of the band and means for simultaneously actuating the cords to extend the band.

4. A range finding instrument comprising a bar, means for holding the bar with its center at a predetermined distance with respect to the eye of the observer, an elastic band of predetermined length apposed along the bar and inscribed at one end with a range scale from zero to infinity, calculated according to a known base line and means for extending the band from each end equal amounts along the bar.

5. A range finding instrument, including a bar, cords attached to the bar equi-distantly from the center, a rod secured to the cords at a point which when the cords are taut, will be a predetermined distance from the center of the bar, a sliding mouth piece on the rod and a head strap on the rod.

6. A range finding instrument, including a bar, cords attached to the bar equi-distantly from the center, a rod secured to the cords at a point which when the cords are taut, will be a predetermined distance from the center of the bar and a head strap on the rod.

7. In a range finding instrument, an expansible member inscribed with a range scale and sighting marks, means whereby a predetermined point is established for sighting over the sighting marks at two objects, and means for adjusting the expansible member to the observation angle.

JOSEPH T. ZAK.